United States Patent
Ishida et al.

(10) Patent No.: US 11,027,982 B2
(45) Date of Patent: Jun. 8, 2021

(54) MICA-MADE MEMBER, ELECTROCHEMICAL REACTION UNIT, AND ELECTROCHEMICAL REACTION CELL STACK

(71) Applicant: MORIMURA SOFC TECHNOLOGY CO., LTD., Komaki (JP)

(72) Inventors: Satoru Ishida, Nagoya (JP); Tomoki Murata, Nagoya (JP); Ryoji Tanimura, Nagoya (JP); Tatsuya Ono, Nagoya (JP); Nobuyuki Hotta, Nagoya (JP)

(73) Assignee: MORIMURA SOFC TECHNOLOGY CO., LTD., Komaki (JP)

( * ) Notice: Subject to any disclaimer, the term of this patent is extended or adjusted under 35 U.S.C. 154(b) by 15 days.

(21) Appl. No.: 16/332,042

(22) PCT Filed: Sep. 11, 2017

(86) PCT No.: PCT/JP2017/032715
§ 371 (c)(1),
(2) Date: Mar. 11, 2019

(87) PCT Pub. No.: WO2018/051954
PCT Pub. Date: Mar. 22, 2018

(65) Prior Publication Data
US 2019/0218104 A1    Jul. 18, 2019

(30) Foreign Application Priority Data
Sep. 13, 2016    (JP) .............. JP2016-178409

(51) Int. Cl.
*C01B 33/42*    (2006.01)
*H01M 8/02*    (2016.01)
(Continued)

(52) U.S. Cl.
CPC .............. *C01B 33/42* (2013.01); *C25B 9/00* (2013.01); *C25B 9/70* (2021.01); *H01M 8/02* (2013.01);
(Continued)

(58) Field of Classification Search
CPC ....... C01B 33/42; C01P 2002/72; C25B 9/00; C25B 9/18; H01M 8/02; H01M 8/12;
(Continued)

(56) References Cited

U.S. PATENT DOCUMENTS 2,863,721 A * 12/1958 Endicott ................ C04B 20/04
423/328.2

FOREIGN PATENT DOCUMENTS

JP    4-162312 A    6/1992
JP    7-282835 A    10/1995
(Continued)

OTHER PUBLICATIONS

Machine translation of Japanese Patent Publication No. 2015/125981, published Jul. 6, 2015. (Year: 2015).*
(Continued)

*Primary Examiner* — Miriam Stagg
*Assistant Examiner* — Lilia Nedialkova
(74) *Attorney, Agent, or Firm* — Sughrue Mion, PLLC

(57) ABSTRACT

A mica-made member having a crystal structure exhibiting an intensity peak of $KMg_3(Si_3Al)O_{10}(OH)_2$ and an intensity peak of $Mg_2SiO_4$ in X-ray diffractometry (XRD). Also disclosed is an electrochemical reaction unit including a structural member formed of the mica-made member and an electrochemical reaction cell stack.

6 Claims, 11 Drawing Sheets

| | MICA THERMAL TREATMENT CONDITIONS | | PEAK INTENSITY RATIO | AMOUNT OF SCATTERED Si (ppm) | VOLTAGE REDUCTION AFTER TESTING AT 850°C FOR 400 h (mV) | RATING (< 65 mV) |
|---|---|---|---|---|---|---|
| | TEMPERATURE (°C) | TIME (h) | | | | |
| 1 | 1000 | 30 | 0.0012 | 690 | 63 | ○ |
| 2 | 1100 | 5 | 0.0031 | 670 | 51 | ○ |
| 3 | 1100 | 30 | 0.0282 | 600 | 46 | ○ |
| 4 | 1000 | 120 | 0.1500 | 600 | 45 | ○ |
| 5 | 850 | 5 | 0.0002 | 900 | 78 | × |
| 6 | 1300 | 30 | BREAKAGE | – | – | – |

(51) Int. Cl.
  *C25B 9/00* (2021.01)
  *C25B 9/70* (2021.01)
  *H01M 8/2457* (2016.01)
  *H01M 8/2483* (2016.01)
  *H01M 8/242* (2016.01)
  *H01M 8/12* (2016.01)

(52) U.S. Cl.
  CPC ......... *H01M 8/242* (2013.01); *H01M 8/2457* (2016.02); *H01M 8/2483* (2016.02); *H01M 8/12* (2013.01)

(58) Field of Classification Search
  CPC .. H01M 8/242; H01M 8/2457; H01M 8/2483; Y02E 60/50
  See application file for complete search history.

(56) References Cited

FOREIGN PATENT DOCUMENTS

JP    2013-157234 A    8/2013
JP    2015-125981 A    7/2015

OTHER PUBLICATIONS

Search report dated Nov. 7, 2017, issued by the International Searching Authority in counterpart International Patent Application No. PCT/JP2017/032715 (PCT/ISA/210).
Communication dated Apr. 28, 2020 from the European Patent Office in application No. 17850856.0.
Alba, M., et al., "Hydrothermal Reactivity of Na-n-Micas (n=2,3,4)", Chemistry of Materials, vol. 18, No. 12, Jun. 1, 2006, pp. 2867-2872, XP055686596.
Mirhabibi, A., et al., "Synthesis of gold pearlescent pigment via heat treatment of mica", Journal of Coatings Technology and Research, vol. 5, No. 1, Sep. 8, 2007, pp. 73-76, XP055686478.

* cited by examiner

| | MICA THERMAL TREATMENT CONDITIONS | | PEAK INTENSITY RATIO | AMOUNT OF SCATTERED Si (ppm) | VOLTAGE REDUCTION AFTER TESTING AT 850°C FOR 400 h (mV) | RATING (<65 mV) |
|---|---|---|---|---|---|---|
| | TEMPERATURE (°C) | TIME (h) | | | | |
| 1 | 1000 | 30 | 0.0012 | 690 | 63 | ○ |
| 2 | 1100 | 5 | 0.0031 | 670 | 51 | ○ |
| 3 | 1100 | 30 | 0.0282 | 600 | 46 | ○ |
| 4 | 1000 | 120 | 0.1500 | 600 | 45 | ○ |
| 5 | 850 | 5 | 0.0002 | 900 | 78 | × |
| 6 | 1300 | 30 | BREAKAGE | — | — | — |

FIG. 6

MICA-MADE MEMBER, ELECTROCHEMICAL REACTION UNIT, AND ELECTROCHEMICAL REACTION CELL STACK

CROSS REFERENCE TO RELATED APPLICATIONS

This application is a National Stage of International Application No. PCT/JP2017/032715 filed Sep. 11, 2017, claiming priority based on Japanese Patent Application No. 2016-178409, filed on Sep. 13, 2016.

TECHNICAL FIELD

A technique disclosed in the present specification relates to a mica-made member.

BACKGROUND ART

A known type of a fuel cell for generating electricity by utilizing electrochemical reaction between hydrogen and oxygen is a solid oxide fuel cell (hereinafter may be referred to as "SOFC"). A fuel cell electricity generation unit forming the SOFC includes a fuel cell unit cell including an electrolyte layer, a cathode, and an anode such that the cathode and the anode face each other in a first direction and the electrolyte layer intervenes between these electrodes. The fuel cell electricity generation unit also includes a cathode-side member and an anode-side member. The cathode-side member forms a cathode chamber facing the cathode, and the anode-side member forms an anode chamber facing the anode. In a certain type of fuel cell electricity generation unit, the cathode-side member or the anode-side member is formed of mica (see Patent Documents 1 and 2).

A certain type of mica sheet contains an Si (silicon)-containing binder. In the case where the anode-side member is formed of such a mica sheet containing an Si-containing binder, an increase in temperature due to electricity generating operation may cause scattering of Si contained in the anode-side member. Scattered Si may deposit on, for example, the surface of an oxygen ion-conductive material forming the anode, leading to a decrease in the area of three-phase interface serving as a reaction field, resulting in a change (reduction) in the electricity generation performance of the fuel cell electricity generation unit. A disclosed technique for solving such a problem involves heating of a mica sheet containing a binder at a temperature of lower than 850(° C.) to thereby cause scattering of Si contained in the binder, and use of the mica sheet as an anode-side member (see Patent Document 3).

PRIOR ART DOCUMENTS

Patent Documents

Patent Document 1: Japanese Patent Application Laid-Open (kokai) No. H04-162312
Patent Document 2: Japanese Patent Application Laid-Open (kokai) No. H07-282835
Patent Document 3: Japanese Patent Application Laid-Open (kokai) No. 2015-125981

SUMMARY OF THE INVENTION

Problem to be Solved by the Invention

Si is contained not only in the binder contained in the mica sheet, but also in mica itself. Thus, the aforementioned technique involving heating of the mica sheet at a temperature of lower than 850(° C.) may fail to reduce scattering of Si contained in mica itself, even if the technique can reduce scattering of Si contained in the binder.

Such a problem is common with a mica-made member used in an electrolysis cell, which is a minimum constitutive unit of a solid oxide electrolysis cell (hereinafter may be referred to as "SOEC") for generating hydrogen by utilizing the electrolysis of water. In the present specification, a fuel cell unit and an electrolysis cell unit are collectively referred to as an "electrochemical reaction unit." Such a problem is also common with a mica-made member used in products other than electrochemical reaction units.

The present specification discloses a technique capable of solving the aforementioned problems.

Means for Solving the Problem

A technique disclosed in the present specification can be implemented in the following modes.

(1) The mica-made member disclosed in the specification has a crystal structure exhibiting a diffraction intensity peak attributed to (hereinafter referred to simply as "an intensity peak of") $KMg_3(Si_3Al)O_{10}(OH)_2$ and a diffraction intensity peak attributed to (hereinafter referred to simply as "an intensity peak of") $Mg_2SiO_4$ in X-ray diffractometry (XRD). The present inventors have found that, on the basis of the results of, for example, experiments, a mica-made member having a crystal structure exhibiting an intensity peak of $KMg_3(Si_3Al)O_{10}(OH)_2$ (soft mica) and an intensity peak of $Mg_2SiO_4$ (forsterite) in X-ray diffractometry (XRD) can reduce Si scattering to a greater extent than can pure soft mica exhibiting only an intensity peak of $KMg_3(Si_3Al)O_{10}(OH)_2$ in XRD. Thus, the mica-made member, which has a crystal structure exhibiting an intensity peak of $KMg_3(Si_3Al)O_{10}(OH)_2$ and an intensity peak of $Mg_2SiO_4$ in XRD, can reduce Si scattering. This reduction in Si scattering is probably attributed to the fact that an $Mg_2SiO_4$ crystal structure is more stable and less likely to be degraded than is a $KMg_3(Si_3Al)O_{10}(OH)_2$ crystal structure.

(2) In the aforementioned mica-made member, the ratio of the intensity of a peak of the (120) plane of $Mg_2SiO_4$ to the intensity of a peak of the (003) plane of $KMg_3(Si_3Al)O_{10}(OH)_2$ may be adjusted to 0.001 or more. According to the mica-made member, the ratio of the intensity of the peak of the (120) plane of $Mg_2SiO_4$ to the intensity of the peak of the (003) plane of $KMg_3(Si_3Al)O_{10}(OH)_2$ is 0.001 or more, and thus Si is present in the form of $Mg_2SiO_4$. Therefore, Si scattering can be more reliably reduced.

(3) In the aforementioned mica-made member, the ratio of the intensity of the peak of the (120) plane of $Mg_2SiO_4$ to the intensity of the peak of the (003) plane of $KMg_3(Si_3Al)O_{10}(OH)_2$ may be adjusted to 0.15 or less. Since the ratio of the intensity of the peak of the (120) plane of $Mg_2SiO_4$ to the intensity of the peak of the (003) plane of $KMg_3(Si_3Al)O_{10}(OH)_2$ is 0.15 or less, Si is also present in the form of $KMg_3(Si_3Al)O_{10}(OH)_2$ in a sufficient amount. Therefore, impairment of intrinsic properties of mica (e.g., sealing property) can be prevented.

(4) In the aforementioned mica-made member, the ratio of the intensity of the peak of the (120) plane of $Mg_2SiO_4$ to the intensity of the peak of the (003) plane of $KMg_3(Si_3Al)O_{10}$ $(OH)_2$ may be adjusted to 0.003 or more. Since the ratio of the intensity of the peak of the (120) plane of $Mg_2SiO_4$ to the intensity of the peak of the (003) plane of $KMg_3(Si_3Al)O_{10}$ (OH)$_2$ is 0.003 or more, Si is present in the form of Mg$_2$SiO$_4$. Therefore, Si scattering can be more reliably reduced.

(5) In the aforementioned the mica-made member, the ratio of the intensity of the peak of the (120) plane of Mg$_2$SiO$_4$ to the intensity of the peak of the (003) plane of KMg$_3$(Si$_3$Al)O$_{10}$(OH)$_2$ may be adjusted to 0.029 or less. Since the ratio of the intensity of the peak of the (120) plane of Mg$_2$SiO$_4$ to the intensity of the peak of the (003) plane of KMg$_3$(Si$_3$Al)O$_{10}$(OH)$_2$ is 0.029 or less, Si is also present in the form of KMg$_3$(Si$_3$Al)O$_{10}$(OH)$_2$ in a sufficient amount. Therefore, impairment of intrinsic properties of mica (e.g., sealing property) can be prevented.

(6) In an electrochemical reaction unit comprising a unit cell including an electrolyte layer, and a cathode and an anode that face each other in a first direction with the electrolyte layer intervening therebetween; and a structural member that faces a cathode chamber facing the cathode or an anode chamber facing the anode, the structural member may be formed of a mica-made member as recited in any one of the above paragraphs (1) to (5). According to the electrochemical reaction unit, impairment of the performance of the reaction unit, which would otherwise occur due to Si scattering in the cathode chamber or the anode chamber, can be prevented.

(7) In an electrochemical reaction cell stack comprising a plurality of electrochemical reaction units arrayed in a first direction, at least one of the electrochemical reaction units may be an electrochemical reaction unit as recited in the above paragraph (6).

The technique disclosed in the present specification can be implemented in various modes; for example, a mica-made member, a structural member, an electrochemical reaction unit cell (fuel cell unit cell or electrolysis cell), an electrochemical reaction unit (fuel cell electricity generation unit), an electrochemical reaction cell stack (fuel cell stack or electrolysis cell stack) including a plurality of electrochemical reaction unit cells, and a production method therefor.

BRIEF DESCRIPTION OF THE DRAWINGS

FIG. 6 Explanatory view showing the results of performance evaluation of samples.

MODES FOR CARRYING OUT THE INVENTION

A. Embodiment

A-1. Structure (Structure of Fuel Cell Stack 100)

Figure 1:
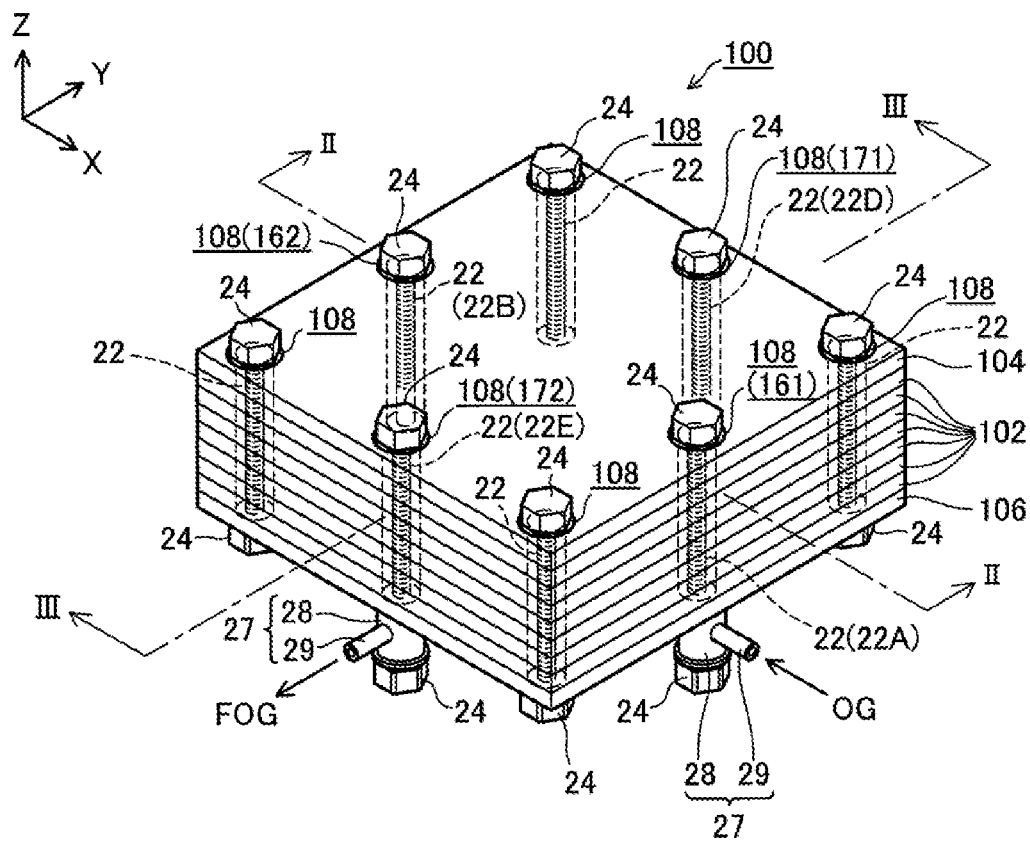
FIG. 1 Perspective view showing the external appearance of a fuel cell stack 100 according to an embodiment.
Figure 2:
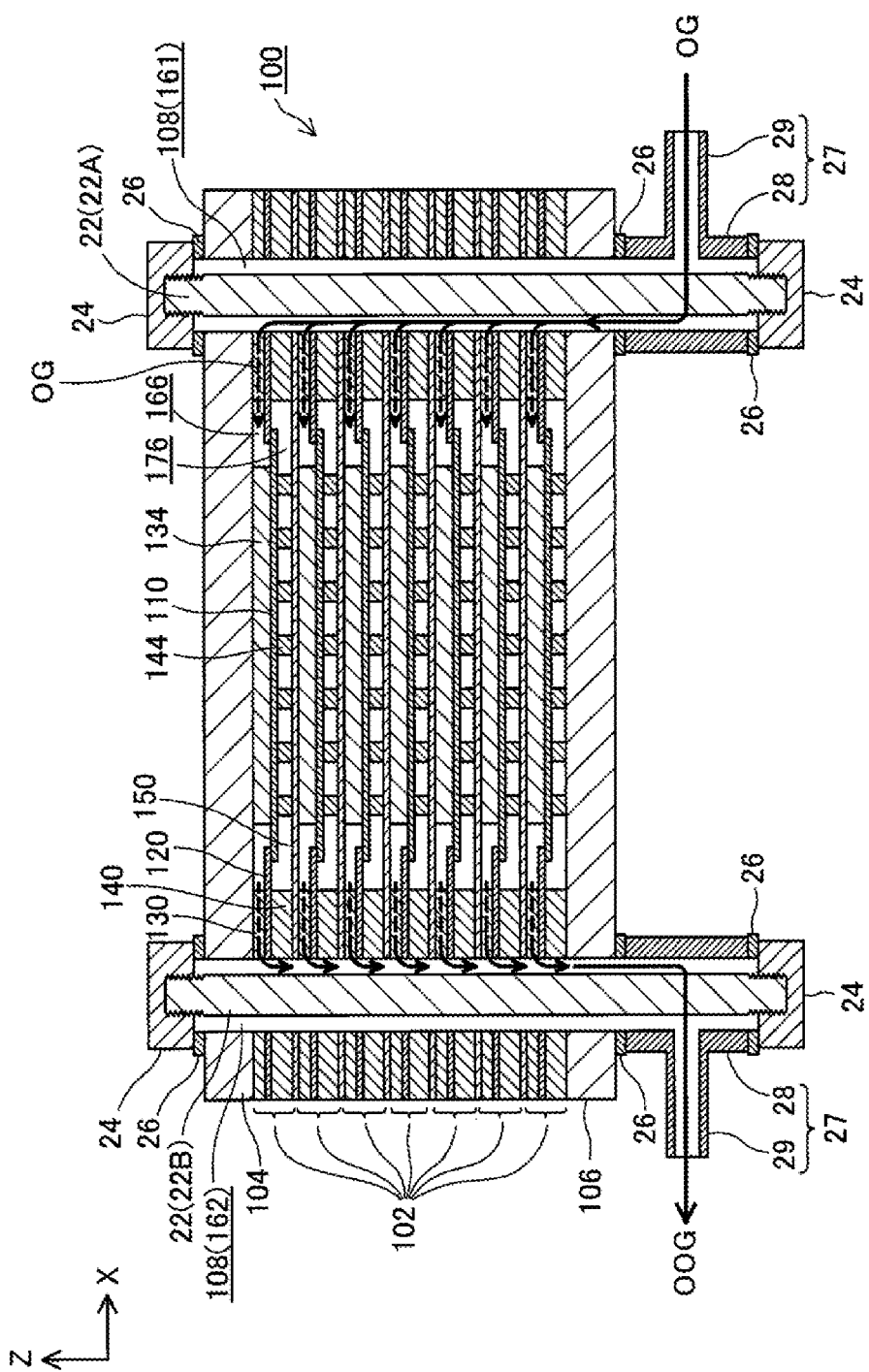
FIG. 2 Explanatory view showing an XZ section of the fuel cell stack 100 taken along line II-II of FIG. 1.
Figure 3:
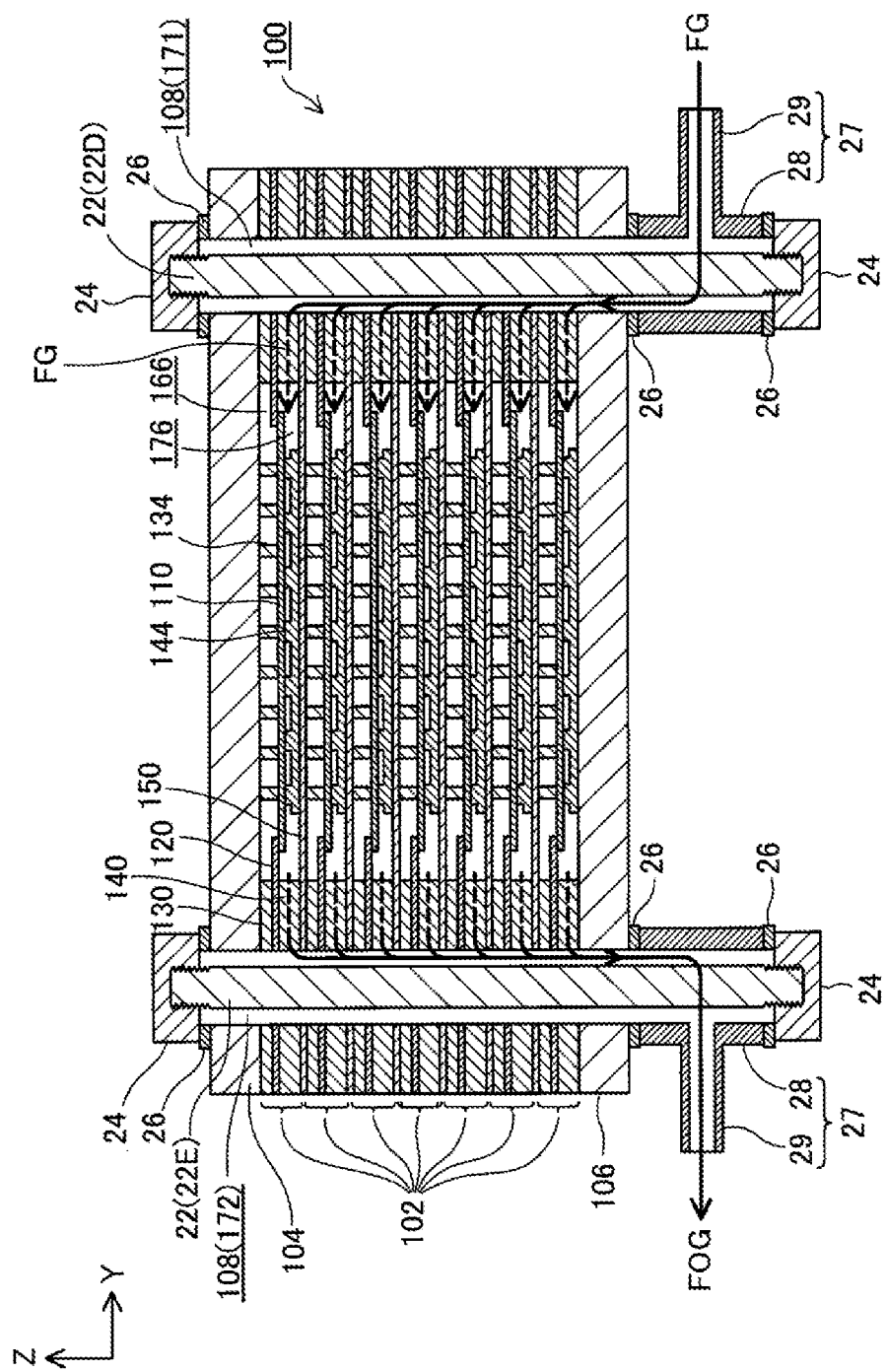
FIG. 3 Explanatory view showing a YZ section of the fuel cell stack 100 taken along line III-III of FIG. 1.

FIG. 1 is a perspective view showing the external appearance of a fuel cell stack 100 according to the present embodiment; FIG. 2 is an explanatory view showing an XZ section of the fuel cell stack 100 taken along line II-II of FIG. 1; and FIG. 3 is an explanatory view showing a YZ section of the fuel cell stack 100 taken along line III-III of FIG. 1. FIGS. 1 to 3 show mutually orthogonal X-axis, Y-axis, and Z-axis for specifying respective directions. In the present specification, for the sake of convenience, the positive Z-axis direction is called the "upward direction" and the negative Z-axis direction is called the "downward direction"; however, in actuality, the fuel cell stack 100 may be disposed in a different orientation. The same also applies to FIG. 4 and subsequent drawings. The fuel cell stack corresponds to the electrochemical reaction cell stack appearing in CLAIMS.

The fuel cell stack 100 includes a plurality of (seven in the present embodiment) of electricity generation units 102 and a pair of end plates 104 and 106. The seven electricity generation units 102 are disposed in a predetermined direction of array (in the vertical direction in the present embodiment). A pair of the end plates 104 and 106 is disposed in such a manner as to hold an assembly of the seven electricity generation units 102 from the upper and lower sides thereof. The direction of array (vertical direction) corresponds to the first direction appearing in CLAIMS.

The fuel cell stack 100 has a plurality (eight in the present embodiment) of holes extending in the vertical direction through peripheral portions about the Z-axis direction of its component layers (the electricity generation units 102 and the end plates 104 and 106). The corresponding holes formed in the layers communicate with one another in the vertical direction, thereby forming communication holes 108 extending in the vertical direction from one end plate 104 to the other end plate 106. In the following description, individual holes which constitute each communication hole 108 and are formed in the individual layers of the fuel cell stack 100 will be referred to as the "communication holes 108."

Bolts 22 extending in the vertical direction are inserted into the corresponding communication holes 108, and the fuel cell stack 100 is fastened by means of the bolts 22 and nuts 24 engaged with opposite ends of the bolts 22. As shown in FIGS. 2 and 3, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, which will be described later, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space exists between the outer circumferential surface of the shaft portion of each bolt 22 and the inner circumferential surface of each communication hole 108. As shown in FIGS. 1 and 2, a space defined by the bolt 22 (bolt 22A) located at around the midpoint of one side of the perimeter about the Z-axis direction of the fuel cell stack 100 (a side at the positive side in the X-axis direction of two sides in parallel with the Y-axis) and the communication hole 108 into which the bolt 22A is inserted functions as an oxidizer gas introduction manifold 161 into which oxidizer gas OG is introduced from outside the fuel cell stack 100 and which serves as a gas flow channel for supplying the oxidizer gas OG to the electricity generation units 102, whereas a space defined by the bolt 22 (bolt 22B) located at around the midpoint of the other side opposite the above side (a side at the negative side in the X-axis direction of two sides in parallel with the Y-axis) and the communication hole 108 into which the bolt 22B is inserted functions as an oxidizer gas discharge manifold 162 from which oxidizer offgas OOG discharged from the cathode chambers 166 of the electricity generation units 102 is discharged to the outside of the fuel cell stack 100. In the present embodiment, for example, air is used as the oxidizer gas OG.

As shown in FIGS. 1 and 3, a space defined by the bolt 22 (bolt 22D) located at around the midpoint of one side of the perimeter about the Z-axis direction of the fuel cell stack 100 (a side at the positive side in the Y-axis direction of two sides in parallel with the X-axis) and the communication hole 108 into which the bolt 22D is inserted functions as a fuel gas introduction manifold 171 into which fuel gas FG is introduced from outside the fuel cell stack 100 and which supplies the fuel gas FG to the electricity generation units 102, whereas a space defined by the bolt 22 (bolt 22E) located at around the midpoint of the other side opposite the above side (a side at the negative side in the Y-axis direction of two sides in parallel with the X-axis) and the communication hole 108 into which the bolt 22E is inserted functions as a fuel gas discharge manifold 172 from which fuel offgas FOG discharged from the anode chambers 176 of the electricity generation units 102 is discharged to the outside of the fuel cell stack 100. In the present embodiment, for example, hydrogen-rich gas reformed from city gas is used as the fuel gas FG.

The fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which partially defines the oxidizer gas introduction manifold 161 communicates with the oxidizer gas introduction manifold 161, whereas the hole of the body portion 28 of the gas passage member 27 disposed at the position of the bolt 22B which partially defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

(Structure of End Plates 104 and 106)

The two end plates 104 and 106 are electrically conductive members each having an approximately rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 functions as a positive output terminal of the fuel cell stack 100, and the lower end plate 106 functions as a negative output terminal of the fuel cell stack 100.

(Structure of Electricity Generation Unit 102)

Figure 4:
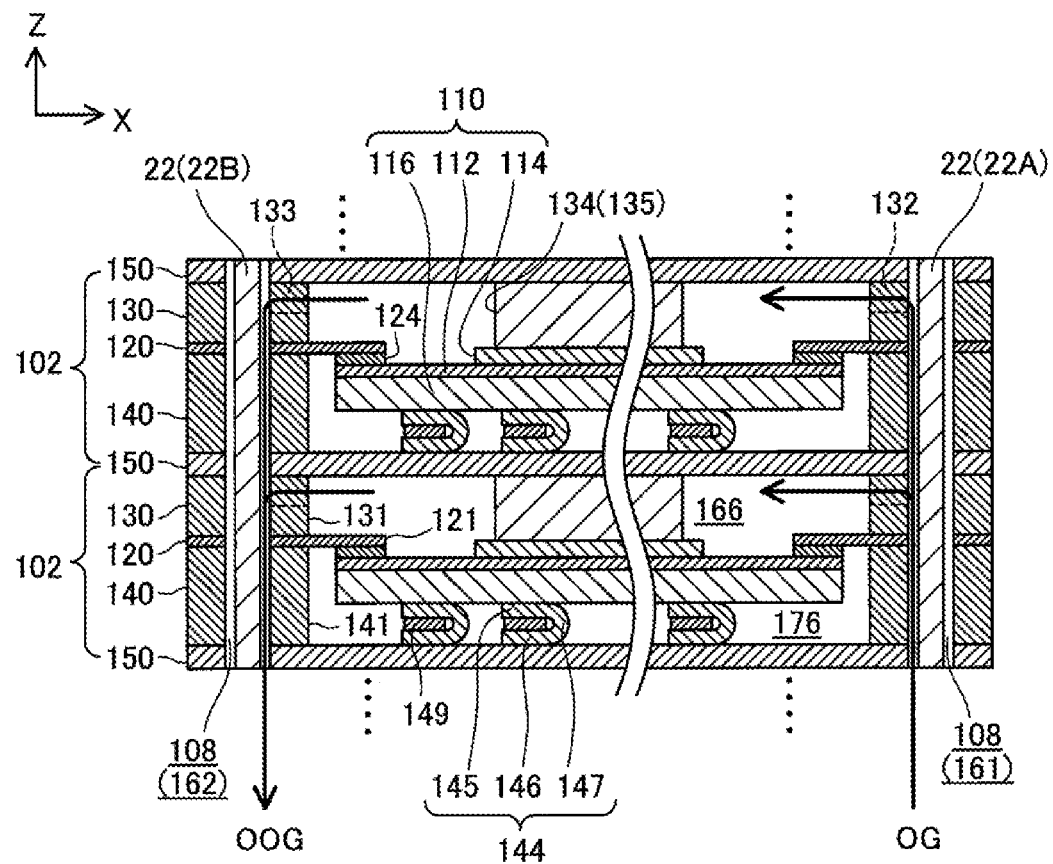
FIG. 4 Explanatory view of the same XZ section as that of FIG. 2, showing two adjacent electricity generation units 102.
Figure 5:
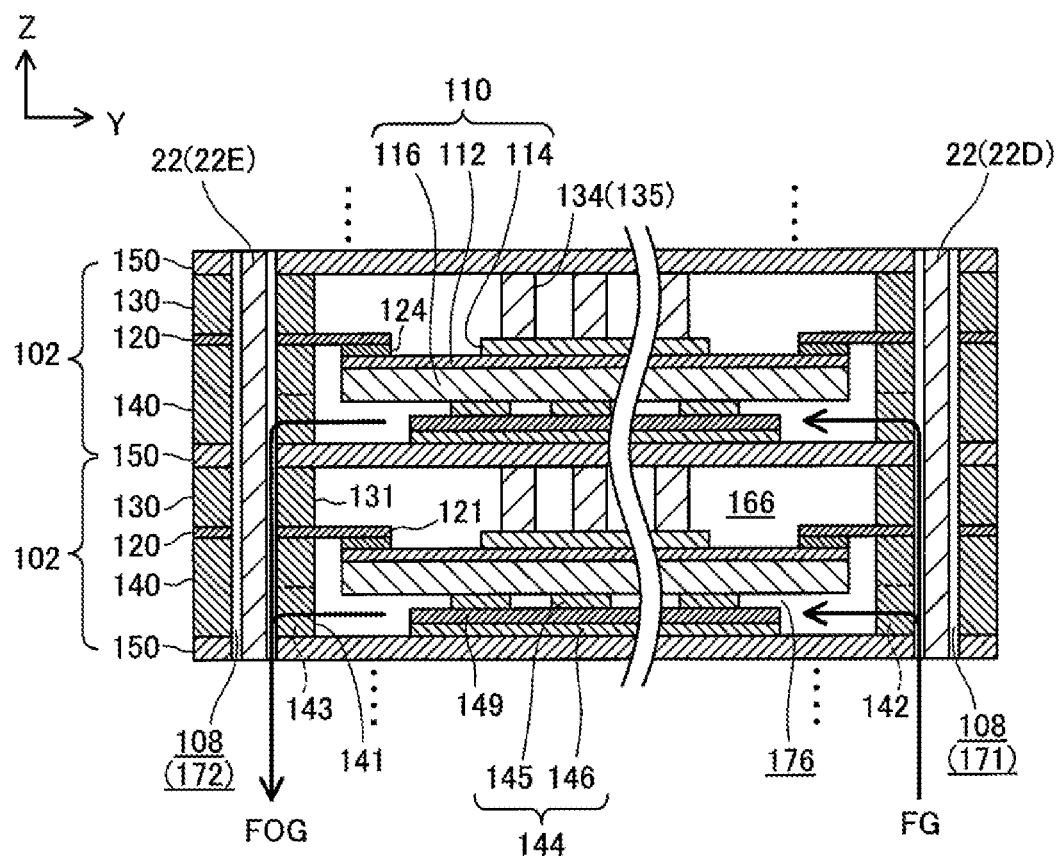
FIG. 5 Explanatory view of the same YZ section as that of FIG. 3, showing two adjacent electricity generation units 102.

FIG. 4 is an explanatory view of the same XZ section as that of FIG. 2, showing two adjacent electricity generation units 102, and FIG. 5 is an explanatory view of the same YZ section as that of FIG. 3, showing two adjacent electricity generation units 102.

As shown in FIGS. 4 and 5, the electricity generation unit 102, which is a minimum unit for electricity generation, includes a unit cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the communication holes 108 into which the bolts 22 are inserted are formed in peripheral portions about the Z-axis direction of the separator 120, the cathode-side frame 130, the anode-side frame 140, and the interconnectors 150. The electricity generation unit 102 corresponds to the electrochemical reaction unit appearing in CLAIMS.

The interconnector 150 is an electrically conductive member having an approximately rectangular flat plate shape and is formed of, for example, ferritic stainless steel. The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 does not have the lower interconnector 150 (see FIGS. 2 and 3).

The unit cell 110 includes an electrolyte layer 112, a cathode 114 and an anode 116 which face each other in the vertical direction (in the direction of array of the electricity generation units 102) with the electrolyte layer 112 intervening therebetween. The unit cell 110 of the present embodiment is an anode-support-type unit cell in which the anode 116 supports the electrolyte layer 112 and the cathode 114.

The electrolyte layer 112 is a member having an approximately rectangular flat-plate shape and containing at least Zr. The electrolyte layer 112 is formed of a solid oxide, such as YSZ (yttria-stabilized zirconia), ScSZ (scandia-stabilized zirconia), or CaSZ (calcia-stabilized zirconia). The cathode 114 is a member having an approximately rectangular flat-plate shape and is formed of, for example, a perovskite oxide (e.g., LSCF (lanthanum strontium cobalt ferrite), LSM (lanthanum strontium manganese oxide), or LNF (lanthanum nickel ferrite)). The anode 116 is a member having an approximately rectangular flat-plate shape and is formed of, for example, Ni (nickel), a cermet of Ni and ceramic particles, or an Ni-based alloy. Thus, the unit cell 110 (electricity generation unit 102) according to the present embodiment is a solid oxide fuel cell (SOFC) containing a solid oxide as an electrolyte.

The separator 120 is a frame member which has an approximately rectangular hole 121 formed in a central region thereof and extending therethrough in the vertical direction, and is formed of, for example, a metal. A portion of the separator 120 around the hole 121 faces a peripheral portion of the surface of the electrolyte layer 112 on the cathode 114 side. The separator 120 is bonded to the electrolyte layer 112 (unit cell 110) by means of a bonding layer 124 formed of a brazing material (e.g., Ag brazing material) and disposed between the facing portion of the separator 120 and the electrolyte layer 112. The separator 120 separates the cathode chamber 166 which faces the cathode 114, and the anode chamber 176 which faces the anode 116, from each other, thereby preventing gas leakage from one electrode side to the other electrode side at a peripheral portion of the unit cell 110. The unit cell 110 to which the separator 120 is bonded is called a "separator-attached unit cell."

The cathode-side frame 130 is a frame member which has an approximately rectangular hole 131 formed in a central region thereof and extending therethrough in the vertical direction, and is formed of, for example, an insulator such as mica. The hole 131 of the cathode-side frame 130 partially constitutes the cathode chamber 166 which faces the cathode 114. The cathode-side frame 130 is in contact with a peripheral portion of the surface of the separator 120 on the side opposite the electrolyte layer 112 and with a peripheral portion of the surface of the interconnector 150 on the side toward the cathode 114. The cathode-side frame 130 electrically insulates the two interconnectors 150 included in the electricity generation unit 102 from each other. Also, the cathode-side frame 130 has an oxidizer gas supply communication hole 132 formed therein and adapted to establish communication between the oxidizer gas introduction manifold 161 and the cathode chamber 166, and an oxidizer gas discharge communication hole 133 formed therein and adapted to establish communication between the cathode chamber 166 and the oxidizer gas discharge manifold 162.

The anode-side frame 140 is a frame member which has an approximately rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 is in contact with a peripheral portion of the surface of the separator 120 on the side toward the electrolyte layer 112 and with a peripheral portion of the surface of the interconnector 150 on the side toward the anode 116. Also, the anode-side frame 140 has a fuel gas supply communication hole 142 formed therein and adapted to establish communication between the fuel gas introduction manifold 171 and the anode chamber 176, and a fuel gas discharge communication hole 143 formed therein and adapted to establish communication between the anode chamber 176 and the fuel gas discharge manifold 172.

The anode-side current collector 144 is disposed within the anode chamber 176. The anode-side current collector 144 includes an interconnector facing portion 146, an electrode facing portion 145, and a connection portion 147 which connects the electrode facing portion 145 and the interconnector facing portion 146 to each other, and is formed of, for example, nickel, a nickel alloy, or stainless steel. The electrode facing portion 145 is in contact with the surface of the anode 116 on the side opposite the electrolyte layer 112, and the interconnector facing portion 146 is in contact with the surface of the interconnector 150 on the side toward the anode 116. As described above, since the electricity generation unit 102 disposed at the lowermost position in the fuel cell stack 100 does not have the lower interconnector 150, the interconnector facing portion 146 in the lowermost electricity generation unit 102 is in contact with the lower end plate 106. Since the anode-side current collector 144 is thus configured, the anode-side current collector 144 electrically connects the anode 116 and the interconnector 150 (or the end plate 106) to each other. A spacer 149 formed of, for example, mica is disposed between the electrode facing portion 145 and the interconnector facing portion 146. Thus, the anode-side current collector 144 follows the deformation of the electricity generation unit 102 stemming from a temperature cycle and a pressure variation of reaction gas, thereby maintaining good electrical connection between the anode 116 and the interconnector 150 (or the end plate 106) via the anode-side current collector 144. The spacer 149 corresponds to the mica-made member or the structural member appearing in CLAIMS.

The cathode-side current collector 134 is disposed within the cathode chamber 166. The cathode-side current collector 134 is composed of a plurality of current collector elements 135 each having an approximately rectangular columnar shape and is formed of, for example, ferritic stainless steel. The cathode-side current collector 134 is in contact with the surface of the cathode 114 on the side opposite the electrolyte layer 112 and with the surface of the interconnector 150 on the side toward the cathode 114. As described above, since the electricity generation unit 102 disposed at the uppermost position in the fuel cell stack 100 does not have the upper interconnector 150, the cathode-side current collector 134 in the uppermost electricity generation unit 102 is in contact with the upper end plate 104. Since the cathode-side current collector 134 is thus configured, the cathode-side current collector 134 electrically connects the cathode 114 and the interconnector 150 (or the end plate 104) to each other. The cathode-side current collector 134 and the interconnector 150 may be integrally formed as a unitary member.

A-2. Operation of Fuel Cell Stack 100

As shown in FIGS. 2 and 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27 and is then supplied from the oxidizer gas introduction manifold 161 to the cathode chambers 166 through the oxidizer gas supply communication holes 132 of the electricity generation units 102. Also, as shown in FIGS. 3 and 5, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the anode chambers 176 through the fuel gas supply communication holes 142 of the electricity generation units 102.

When the oxidizer gas OG is supplied to the cathode chamber 166 of each electricity generation unit 102, whereas the fuel gas FG is supplied to the anode chamber 176 of each electricity generation unit 102, the unit cell 110 generates electricity through the electrochemical reaction between the oxidizer gas OG and the fuel gas FG. The electricity generating reaction is an exothermic reaction. In each electricity generation unit 102, the cathode 114 of the unit cell 110 is electrically connected to one interconnector 150 through the cathode-side current collector 134, whereas the anode 116 is electrically connected to the other interconnector 150 through the anode-side current collector 144. Also, a plurality of the electricity generation units 102 contained in the fuel cell stack 100 are connected electrically in series. Accordingly, electric energy generated in the electricity generation units 102 is output from the end plates 104 and 106 which function as output terminals of the fuel cell stack 100. In the SOFC, since electricity is generated at a relatively high temperature (e.g., 700° C. to 1,000° C.), the fuel cell stack 100 may be heated by a heater (not shown) from startup until the high temperature can be maintained by means of heat generated as a result of generation of electricity.

As shown in FIGS. 2 and 4, the oxidizer offgas OOG discharged from the cathode chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3 and 5, the fuel offgas FOG discharged from the anode chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

A-3. Specific Structure of Spacer 149

The spacer 149 has a crystal structure exhibiting an intensity peak (peak of diffraction intensity) of $KMg_3(Si_3Al)O_{10}(OH)_2$ (hereinafter referred to as "soft mica") and an intensity peak of $Mg_2SiO_4$ (hereinafter referred to as "forsterite") in X-ray diffractometry (XRD). In other words, an X-ray diffraction pattern obtained through XRD analysis of the material forming the spacer 149 includes an intensity peak of soft mica and an intensity peak of forsterite. In the X-ray diffraction pattern of the material forming the spacer 149, the ratio of the intensity of a peak of a Miller-index (120) plane of forsterite to the intensity of a peak of a Miller-index (003) plane of mica (hereinafter the ratio may be referred to as "peak intensity ratio") is preferably 0.001 to 0.029.

A-4. Method for Producing Fuel Cell Stack 100

The fuel cell stack 100 having the aforementioned configuration is produced by, for example, a method described below. The unit cell 110 can be produced by any known method. For example, a green sheet for an anode substrate layer, a green sheet for an anode active layer, and a green sheet for an electrolyte layer are provided, and these green sheets are bonded together and then degreased at about 280° C. Subsequently, the resultant product was fired at about 1,350° C., to thereby prepare a laminate of the electrolyte layer 112 and the anode 116. A mixture containing a material for forming a cathode is applied by spraying to the surface of the electrolyte layer 112 of the laminate, followed by firing at 1,100° C., to thereby form the cathode 114. The unit cell 110 having the aforementioned structure is produced through the above-described process.

The spacer 149 can be produced through, for example, the following process. A mica sheet formed of soft mica having a thickness of 0.2 (mm) to 0.6 (mm) (manufactured by Okabe Mica Co., Ltd., product number: D581AK) is subjected to punching, to thereby prepare a flat plate-like workpiece. Subsequently, the workpiece is placed in a heating furnace and heated in air at a temperature of 1,000(° C.) or higher for four or more hours. This process can produce the spacer 149 having the aforementioned crystal structure.

Thereafter, the spacer 149 is disposed between the electrode facing portion 145 and the interconnector facing portion 146 of the anode-side current collector 144. The anode-side current collector 144, the anode-side frame 140, the separator 120 brazed with the unit cell 110, and the cathode-side frame 130 are disposed between the paired interconnectors 150. Thus, the electricity generation unit 102 can be produced. The subsequent assembly process is performed, to thereby complete the production of the fuel cell stack 100 having the aforementioned configuration.

A-5. Performance Evaluation of Samples

Next will be described the performance evaluation of a plurality of samples 1 to 6 (spacers) produced by different processes; i.e., under different conditions for thermal treatment of the aforementioned mica workpiece (hereinafter referred to as "mica thermal treatment"). For the performance evaluation of a plurality of samples 1 to 6, each sample was assembled into the fuel cell stack 100 having the aforementioned configuration, and the fuel cell stack 100 was subjected to determination of durability deterioration ratio (power generation deterioration ratio). FIG. 6 is an explanatory view showing the results of the performance evaluation of the samples.

(Samples)

Samples 1 to 5 correspond to the spacer 149 having the aforementioned structure produced by the aforementioned process, and sample 6 corresponds to a spacer produced by a process in which the conditions for mica thermal treatment are different from those in the aforementioned process. Each of the thus-produced samples 1 to 5 was subjected to XRD (powder X-ray diffractometry), to thereby obtain an X-ray diffraction pattern. Specifically, the X-ray diffraction pattern of each of samples 1 to 5 was obtained by means of an X-ray diffractometer through irradiation of a flat portion of the plate-like mica with X-rays. FIGS. 7 to 11 are explanatory views showing X-ray diffraction patterns of samples 1 to 5. The vertical axis corresponds to diffraction intensity (CPS), and the horizontal axis corresponds to diffraction angle 2θ (deg).

(Sample 1)

Figure 7:
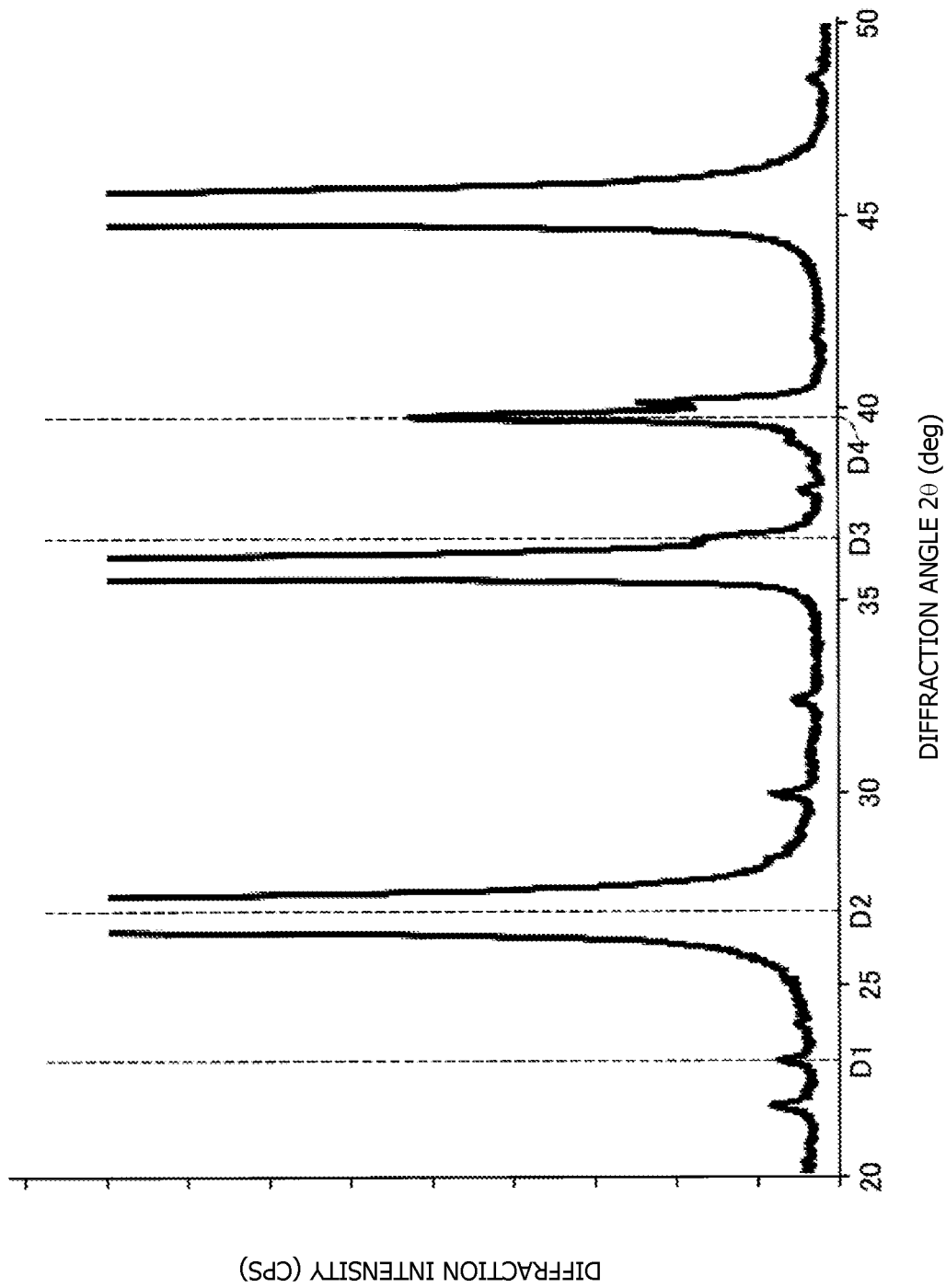
FIG. 7 Explanatory view showing an X-ray diffraction pattern of sample 1.

In the production process for sample 1, the mica thermal treatment is performed through heating at a temperature of 1,000(° C.) for 30 hours. The X-ray diffraction pattern of sample 1 is shown in FIG. 7. The X-ray diffraction pattern of sample 1 was compared with a database of diffraction patterns of known substances (e.g., the Powder Diffraction File (PDF) card in the present embodiment). As a result, the X-ray diffraction pattern of sample 1 was determined to include an intensity peak of a Miller-index (003) plane of soft mica (see diffraction angle D2) and, for example, intensity peaks of Miller-index (120), (211), and (221) planes of forsterite (diffraction angles D1, D3, and D4). Thus, sample 1 is determined to contain soft mica and forsterite crystals. In sample 1, the aforementioned peak intensity ratio is 0.0012.

(Sample 2)

Figure 8:
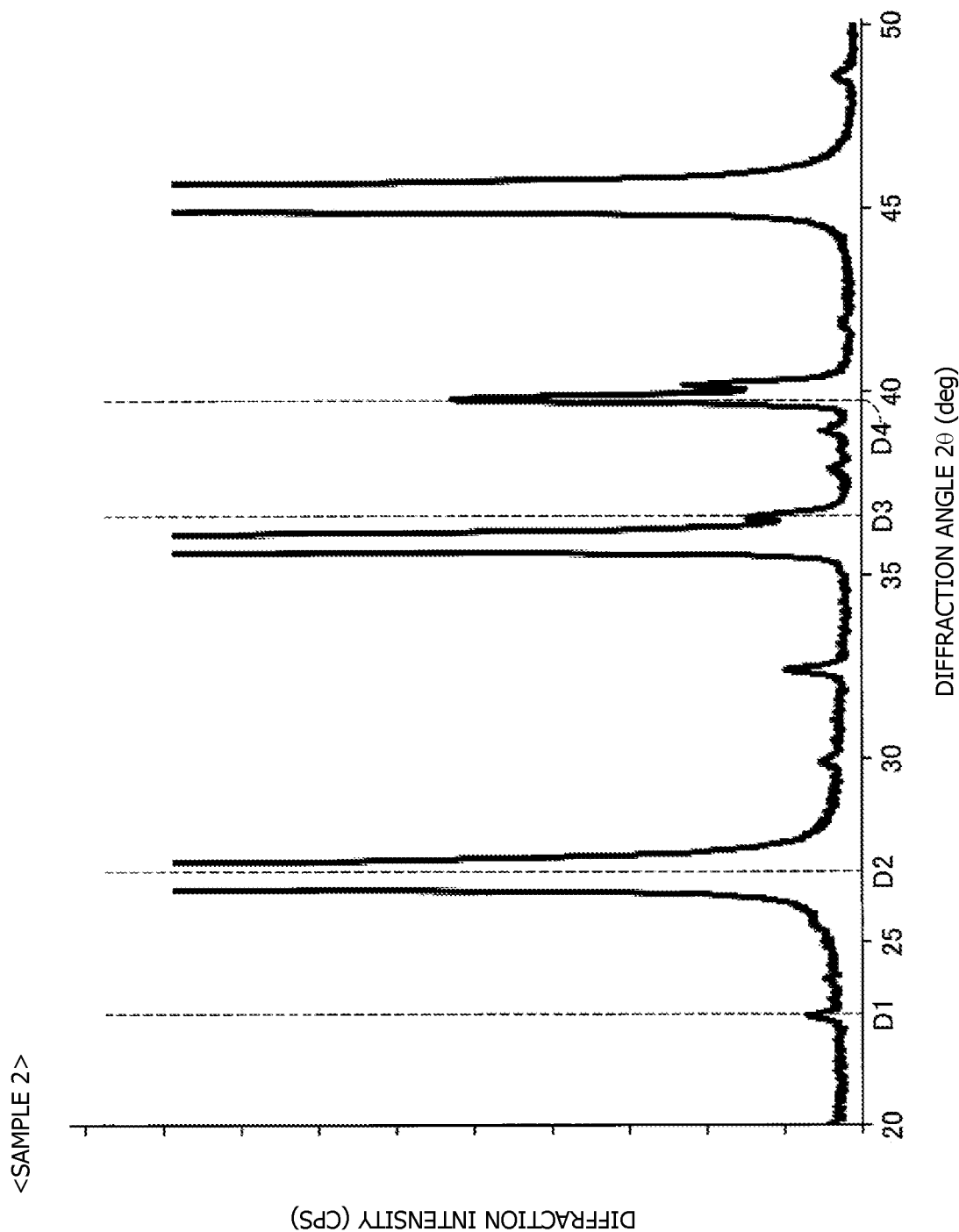
FIG. 8 Explanatory view showing an X-ray diffraction pattern of sample 2.

In the production process for sample 2, the mica thermal treatment is performed through heating at a temperature of 1,100(° C.) for five hours. The X-ray diffraction pattern of sample 2 is shown in FIG. 8. The X-ray diffraction pattern of sample 2 was compared with the PDF card. As a result, the X-ray diffraction pattern of sample 2 was determined to include an intensity peak of a Miller-index (003) plane of soft mica (see diffraction angle D2) and, for example, intensity peaks of Miller-index (120), (211), and (221) planes of forsterite (diffraction angles D1, D3, and D4) as in the case of sample 1. Thus, sample 2 is determined to contain soft mica and forsterite crystals. In sample 2, the aforementioned peak intensity ratio is 0.0031.

(Sample 3)

Figure 9:
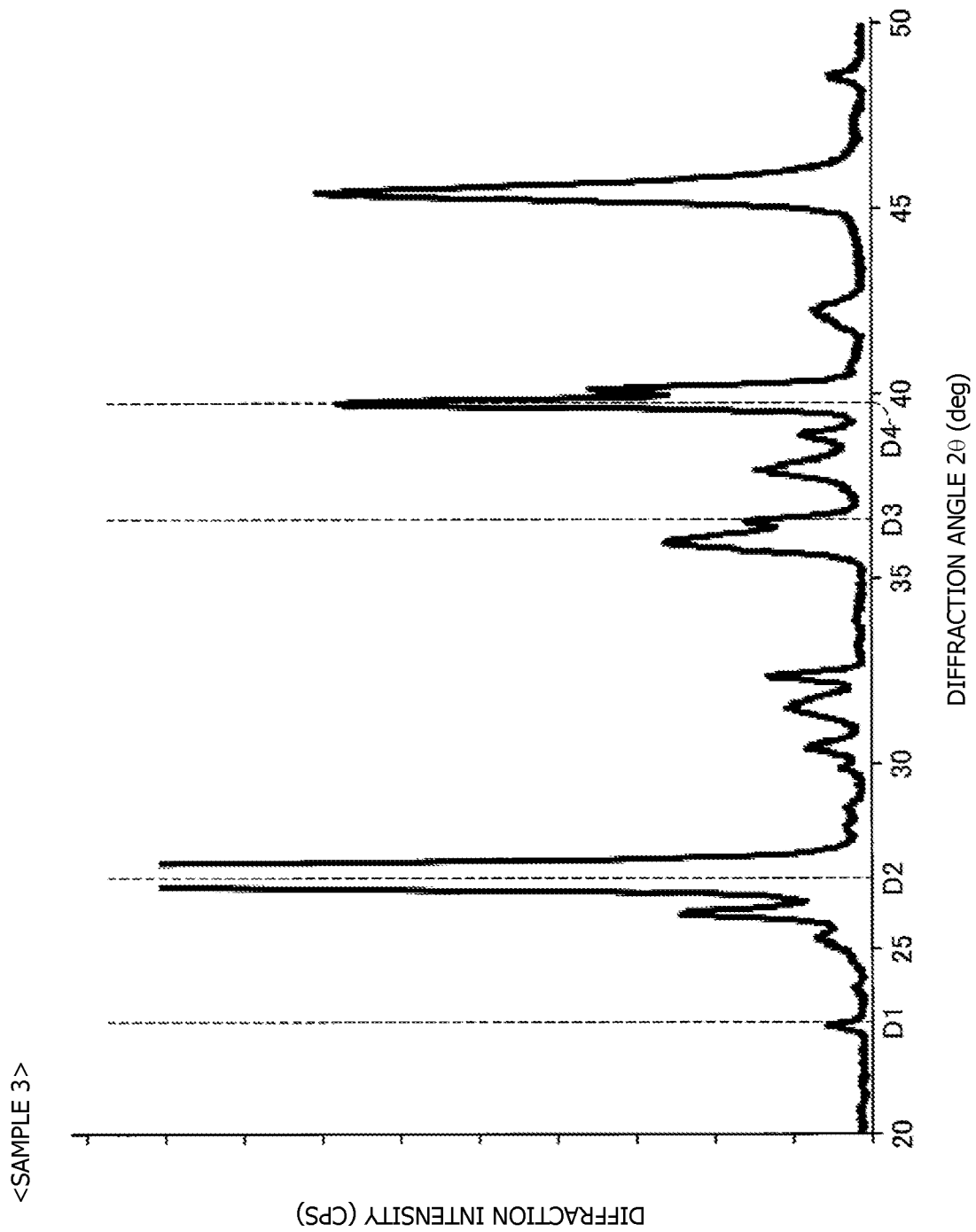
FIG. 9 Explanatory view showing an X-ray diffraction pattern of sample 3.

In the production process for sample 3, the mica thermal treatment is performed through heating at a temperature of 1,100(° C.) for 30 hours. The X-ray diffraction pattern of sample 3 is shown in FIG. 9. The X-ray diffraction pattern of sample 3 was compared with the PDF card. As a result, the X-ray diffraction pattern of sample 3 was determined to include an intensity peak of a Miller-index (003) plane of soft mica (see diffraction angle D2) and, for example, intensity peaks of Miller-index (120), (211), and (221) planes of forsterite (diffraction angles D1, D3, and D4) as in the cases of samples 1 and 2. Thus, sample 3 is determined to contain soft mica and forsterite crystals. In sample 3, the aforementioned peak intensity ratio is 0.0282.

(Sample 4)

Figure 10:
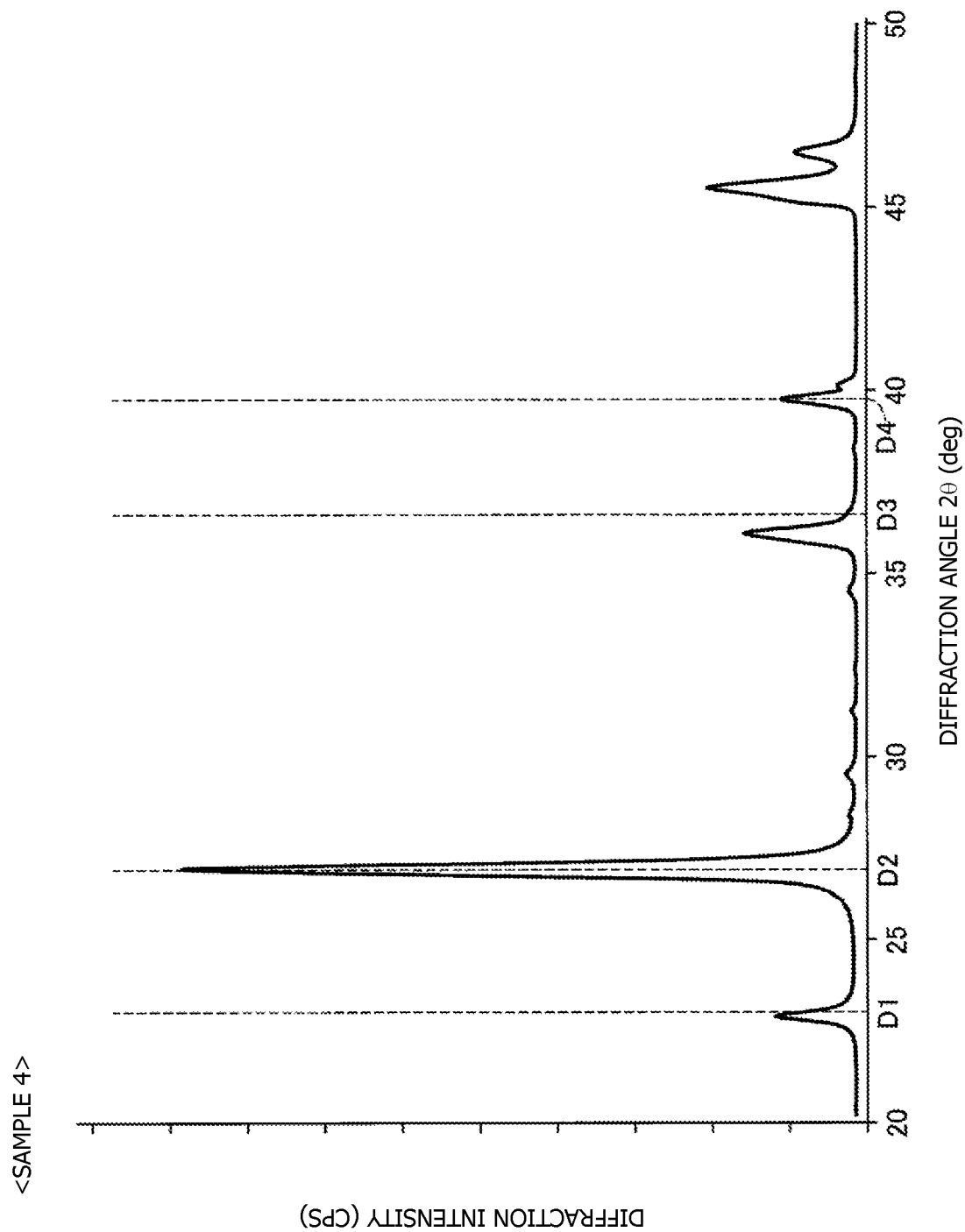
FIG. 10 Explanatory view showing an X-ray diffraction pattern of sample 4.

In the production process for sample 4, the mica thermal treatment is performed through heating at a temperature of 1,000(° C.) for 120 hours. The X-ray diffraction pattern of sample 4 is shown in FIG. 10. The X-ray diffraction pattern of sample 4 was compared with the PDF card. As a result, the X-ray diffraction pattern of sample 4 was determined to include an intensity peak of a Miller-index (003) plane of soft mica (see diffraction angle D2) and, for example, intensity peaks of Miller-index (120), (211), and (221) planes of forsterite (diffraction angles D1, D3, and D4) as in the cases of samples 1 and 2. Thus, sample 4 is determined to contain soft mica and forsterite crystals. In sample 4, the aforementioned peak intensity ratio is 0.1500.

(Sample 5)

Figure 11:
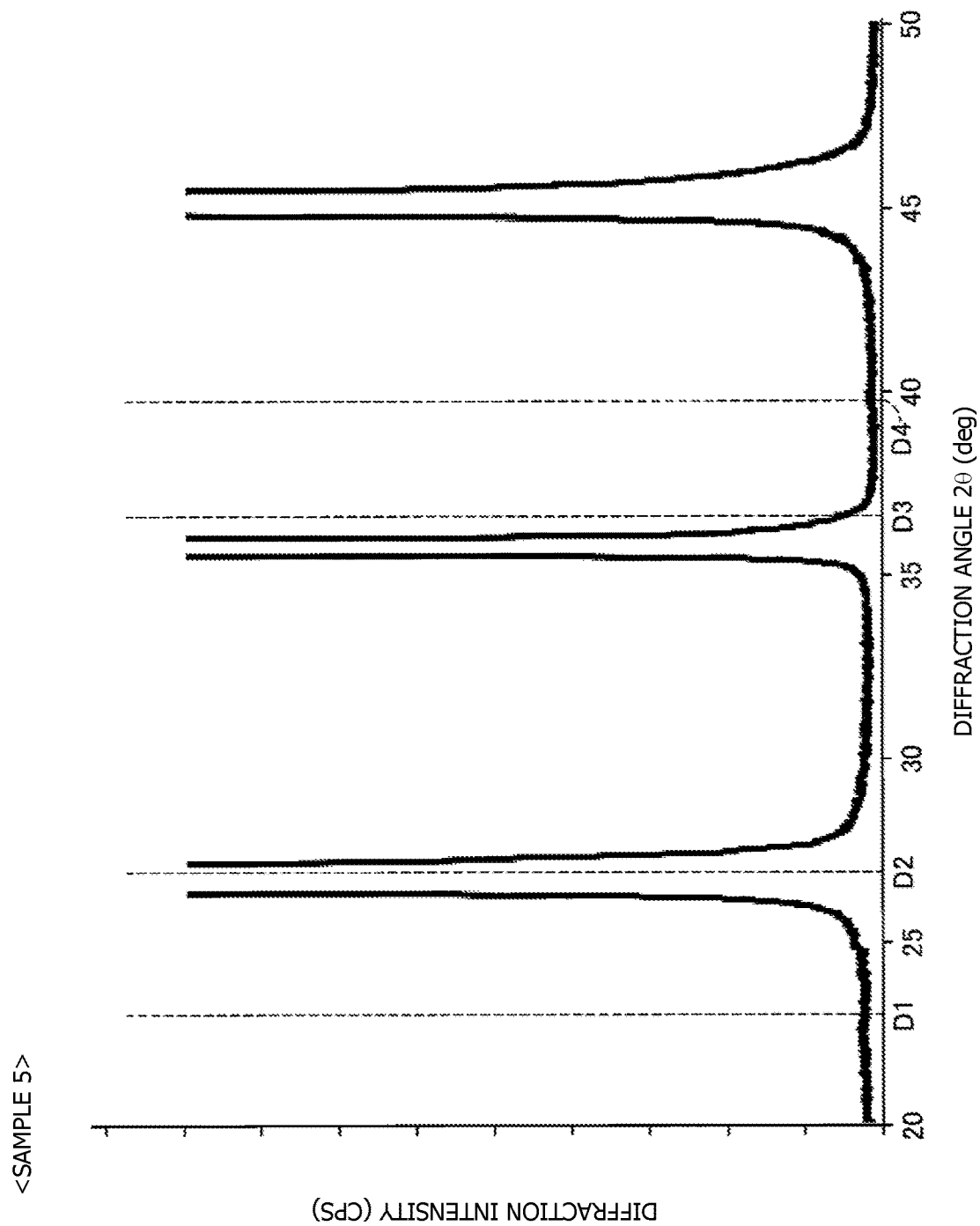
FIG. 11 Explanatory view showing an X-ray diffraction pattern of sample 5.

In the production process for sample 5, the mica thermal treatment is performed through heating at a temperature of 850(° C.) for five hours. The X-ray diffraction pattern of sample 5 is shown in FIG. 11. The X-ray diffraction pattern of sample 5 was compared with the PDF card. As a result, the X-ray diffraction pattern of sample 5 was determined to include an intensity peak of a Miller-index (003) plane of soft mica (see diffraction angle D2), but was barely determined to include intensity peaks of forsterite unlike the cases of samples 1 to 3. Thus, sample 5 is determined to contain a soft mica crystal but no forsterite crystal. In sample 5, the aforementioned peak intensity ratio is 0.0002.

(Sample 6)

In the production process for sample 6, the mica thermal treatment is performed through heating at a temperature of 1,300(° C.) for 30 hours. Sample 6 was broken as a result of the mica thermal treatment under these conditions. Thus, sample 6 was subjected to neither qualitative analysis nor performance evaluation.

(Performance Evaluation Method)

(Voltage Reduction)

Each of the fuel cell stacks 100 including samples 1 to 5 (i.e., five fuel cell stacks 100) was subjected to an energization test for 400 hours while air (i.e., oxidizer gas OG) was supplied to the cathode 114 and 40% water vapor and hydrogen (i.e., fuel gas FG) were supplied to the anode 116 at 850(° C.). In this energization test, the temperature of the fuel cell stack 100 is higher than that during rated electricity generation. Thus, Si (silicon) scattering is likely to occur in the fuel cell stack 100. At the initiation of the energization test, the output voltage of the fuel cell stack 100 was measured at a current density of 0.55 (A/cm$^2$), and the measured value was defined as initial voltage. Subsequently, rated electricity generation was initiated while air (i.e., oxidizer gas OG) was supplied to the cathode 114 and 4% water vapor and hydrogen (i.e., fuel gas FG) were supplied to the anode 116 at about 700(° C.). Thereafter, the output voltage of the fuel cell stack 100 (post-test voltage) was measured at a current density of 0.55 (A/cm$^2$), and a difference between the initial voltage and the post-test voltage (i.e., voltage reduction (mV)) was calculated. A greater voltage reduction indicates a higher power generation deterioration ratio. The post-test voltage corresponds to the output voltage of the fuel cell stack 100 at a temperature lower than that during the energization test. Thus, the voltage difference becomes noticeable, and voltage reduction can be more clearly evaluated. Rating "0" was assigned to a sample exhibiting a voltage reduction less than a reference voltage (e.g., 65 (mV)), whereas rating "X" was assigned to a sample exhibiting a voltage reduction equal to or higher than the reference voltage. The initial voltage of the fuel cell stack 100 corresponds to a voltage measured after the fuel cell stack 100 is shipped in an electricity-generable state and rated electricity generation is performed within 1,000 hours.

(Amount of Scattered Si)

Each of the fuel cell stacks 100 including samples 1 to 5 that had been evaluated for the aforementioned performance (voltage reduction) was used to measure the amount of Si deposited on the surface (exposed to the fuel gas FG) of the anode 116 of the unit cell 110 of the fuel cell stack 100. The amount of deposited Si can be regarded as the amount of scattered Si in each of samples 1 to 5. The amount of scattered Si is measured by a method described below. There is provided a measurement sample including the surface (exposed to the fuel gas FG) of the anode 116 of the unit cell 110. The measurement sample is subjected to secondary ion mass spectrometry (SIMS), to thereby determine the amount of Si deposited on the fuel gas FG-exposed surface of the measurement sample. Specifically, the measurement sample is placed in an SIMS apparatus, and the fuel gas FG-exposed surface of the measurement sample is irradiated with primary ions. This irradiation causes emission of secondary ions from the surface of the measurement sample. The mass analysis of the secondary ions can determine the amount of deposited Si. The amount of deposited Si is regarded as the amount of scattered Si in each of samples 1 to 5.

(Results of Performance Evaluation)

The results of evaluation of samples 1 to 5 will now be examined. As shown in FIG. 6, rating "O" is assigned to samples 1 to 4, whereas rating "X" is assigned to sample 5 for evaluation of voltage reduction. The amount of scattered Si is 600 to 690 (ppm) in samples 1 to 4, whereas the amount of scattered Si is 900 (ppm) in sample 5; i.e., the amount of scattered Si in samples 1 to 4 is smaller than that in sample 5. As described above, each of samples 1 to 4 contains soft mica and forsterite crystals, whereas sample 5 contains a soft mica crystal but no forsterite crystal.

These results suggest that a reduction in the amount of scattered Si is attributed to a crystal structure containing soft mica and forsterite crystals. Thus, each of samples 1 to 4, which contains soft mica and forsterite crystals, has a more stable crystal structure (i.e., Si is less likely to scatter (stronger bonding to Si)) than sample 5, which contains a soft mica crystal but no forsterite crystal. Scattered Si may deposit on, for example, the surface of an oxygen ion-conductive material forming the anode 116, leading to a decrease in the area of three-phase interface serving as a reaction field, resulting in a change (reduction) in the electricity generation performance of the fuel cell stack 100. As described above, the amount of scattered Si in samples 1 to 4 is smaller than that in sample 5. This probably causes prevention of voltage reduction in the fuel cell stack 100.

In each of samples 1 to 4, which contains soft mica and forsterite crystals, the peak intensity ratio is higher than that in sample 5. The peak intensity ratio is particularly preferably 0.001 to 0.15. A peak intensity ratio of 0.001 or more can contribute to more reliable reduction in Si scattering. However, a higher peak intensity ratio may cause impairment of intrinsic properties of mica (e.g., sealing property). A peak intensity ratio of 0.15 or less can lead to prevention of impairment of intrinsic properties of mica. The peak intensity ratio is more preferably 0.003 or more, still more preferably 0.025 or more. The peak intensity ratio is more preferably 0.029 or less.

The results of evaluation of samples 1 to 4 will now be examined. According to the results of evaluation of samples 1 and 3, an increase in the temperature of the mica thermal treatment leads to an increase in peak intensity ratio and a decrease in voltage reduction. Thus, an increase in the temperature of the mica thermal treatment results in a stable crystal structure of the workpiece with reduced Si scattering. According to the results of evaluation of sample 6, the temperature of the mica thermal treatment is preferably lower than 1,300(° C.). According to the results of evaluation of samples 2 and 3, when the mica thermal treatment is performed at the same temperature, a longer heating time leads to an increase in peak intensity ratio and a decrease in voltage reduction. Thus, prolongation of the heating time in the mica thermal treatment results in a stable crystal structure of the workpiece with reduced Si scattering.

A-6. Effects of the Present Embodiment

As described above, the present inventors have found that, on the basis of the results of, for example, experiments, a mica-made member having a crystal structure exhibiting an intensity peak of $KMg_3(Si_3Al)O_{10}(OH)_2$ (soft mica) and an intensity peak of $Mg_2SiO_4$ (forsterite) in XRD can reduce Si scattering to a greater extent than can pure soft mica exhibiting only an intensity peak of $KMg_3(Si_3Al)O_{10}(OH)_2$ in XRD. According to the present embodiment, the spacer 149, which has a crystal structure exhibiting an intensity peak of $KMg_3(Si_3Al)O_{10}(OH)_2$ and an intensity peak of $Mg_2SiO_4$ in XRD, can reduce Si scattering.

Since the ratio of the intensity of the peak of the (120) plane of $Mg_2SiO_4$ to the intensity of the peak of the (003) plane of $KMg_3(Si_3Al)O_{10}(OH)_2$ is 0.001 or more, Si scattering can be more reliably reduced. Since the aforementioned peak intensity ratio is 0.029 or less, impairment of intrinsic properties of mica (e.g., sealing property) can be prevented.

When the ratio of the intensity of the peak of the (120) plane of $Mg_2SiO_4$ to the intensity of the peak of the (003) plane of $KMg_3(Si_3Al)O_{10}(OH)_2$ is 0.003 or more, Si scattering can be more reliably reduced. When the aforementioned peak intensity ratio is 0.15 or less, impairment of intrinsic properties of mica (e.g., sealing property) can be more effectively prevented.

B. Modifications

The technique disclosed in the present specification is not limited to the above embodiment, but may be modified into various other forms without departing from the gist thereof. For example, the technique may be modified as described below.

In the above embodiment, the spacer 149 is exemplified as the mica-made member or the structural member. However, the present invention is not limited thereto, and may be applied to the cathode-side frame 130 formed of mica. If the anode-side frame 140 is formed of mica, the present invention may be applied to the anode-side frame 140. The present invention may be applied to a mica-made member used in a product other than SOFC.

In the above embodiment, the intensity peak ratio is preferably 0.001 to 0.029 in the X-ray diffraction pattern of the spacer 149. However, the intensity peak ratio is not limited thereto, and may be, for example, 0.03 or more. In short, the mica-made member should have at least a crystal structure exhibiting an intensity peak of $KMg_3(Si_3Al)O_{10}(OH)_2$ and an intensity peak of $Mg_2SiO_4$ in XRD.

In the above embodiment, the number of the electricity generation units 102 included in the fuel cell stack 100 is a mere example and is determined as appropriate in accordance with, for example, a required output voltage of the fuel cell stack 100.

In the above embodiment, the nut 24 is engaged with each of opposite ends of the bolt 22. However, the bolt 22 may have a head, and the nut 24 may be engaged with only an end opposite the head of the bolt 22.

In the above embodiment, the end plates 104 and 106 function as output terminals. However, other members connected respectively to the end plates 104 and 106 (e.g., electrically conductive plates disposed respectively between the end plate 104 and the electricity generation unit 102 and between the end plate 106 and the electricity generation unit 102) may function as output terminals.

In the above embodiment, spaces between the outer circumferential surfaces of shaft portions of the bolts 22 and the inner circumferential surfaces of the communication holes 108 are utilized as manifolds. However, axial holes may be provided in the shaft portions of the bolts 22 for use as the manifolds. Also, the manifolds may be provided separately from the communication holes 108 into which the bolts 22 are inserted.

In the above embodiment, in the case where two electricity generation units 102 are disposed adjacent to each other, the adjacent two electricity generation units 102 share a single interconnector 150. However, even in such a case, two electricity generation units 102 may have respective interconnectors 150. Also, in the above embodiment, the uppermost electricity generation unit 102 in the fuel cell stack 100 does not have the upper interconnector 150, and the lowermost electricity generation unit 102 in the fuel cell stack 100 does not have the lower interconnector 150. However, these interconnectors 150 may be provided without elimination.

In the above embodiment, the anode-side current collector 144 may have a structure similar to that of the cathode-side current collector 134; i.e., the anode-side current collector 144 and the adjacent interconnector 150 may be integrally formed as a unitary member. The anode-side frame 140 rather than the cathode-side frame 130 may be an insulator. Also, the cathode-side frame 130 or the anode-side frame 140 may have a multilayer structure.

In the above embodiment, materials used for formation of the members are provided merely by way of example. Other materials may be used to form the members.

In the above embodiment, the hydrogen-rich fuel gas FG is obtained by reforming city gas. However, the fuel gas FG may be obtained from another material, such as LP gas, kerosene, methanol, or gasoline. Alternatively, pure hydrogen may be used as the fuel gas FG.

In the above embodiment (or modifications; the same also applies in the following description), each of the unit cells 110 included in the fuel cell stack 100 is configured to satisfy the requirements described above in the embodiment. If at least one electricity generation unit 102 included in the fuel cell stack 100 has such a configuration, the compatibility between an improvement in the electricity generation performance of the unit cell 110 and maintenance of the strength thereof can be achieved.

The above embodiment corresponds to an SOFC for generating electricity by utilizing the electrochemical reaction between hydrogen contained in fuel gas and oxygen contained in oxidizer gas; however, the present invention is also applicable to an electrolysis cell unit which is the smallest unit of a solid oxide electrolysis cell (SOEC) for generating hydrogen by utilizing the electrolysis of water, and to an electrolysis cell stack having a plurality of electrolysis cell units. Since the structure of the electrolysis cell stack is publicly known as described in, for example, Japanese Patent Application Laid-Open (kokai) No. 2016-81813, detailed description thereof is omitted, but schematically, the electrolysis cell stack has a structure similar to that of the fuel cell stack 100 in the above embodiment. That is, the fuel cell stack 100 in the above embodiment may be read as "electrolysis cell stack," and the electricity generation unit 102 may be read as "electrolysis cell unit." However, in operation of the electrolysis cell stack, voltage is applied between the cathode 114 and the anode 116 such that the cathode 114 is a positive electrode (anode), whereas the anode 116 is a negative electrode (cathode), and water vapor is supplied as material gas through the communication hole 108. Consequently, the electrolysis of water occurs in the electrolysis cell units, whereby hydrogen gas is generated in the anode chambers 176, and hydrogen is discharged to the outside of the electrolysis cell stack through the communication hole 108. Even in the electrolysis cell unit and the electrolysis cell stack having the aforementioned structures, the compatibility between an improvement in the electrochemical reaction property of the electrolysis cell and maintenance of the strength thereof can be achieved by configuring the anode 116 as in the above embodiment.

DESCRIPTION OF REFERENCE NUMERALS

22: bolt; 24: nut; 26: insulation sheet; 27: gas passage member; 28: body portion; 29: branch portion; 100: fuel cell stack; 102: electricity generation unit; 104, 106: end plate; 108: communication hole; 110: unit cell; 112: electrolyte layer; 114: cathode; 116: anode; 120: separator; 121: hole; 124: bonding portion; 130: cathode-side frame; 131: hole; 132: oxidizer gas supply communication hole; 133: oxidizer gas discharge communication hole; 134: cathode-side current collector; 135: current collector element; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 161: oxidizer gas introduction manifold; 162: oxidizer gas discharge manifold; 166: cathode chamber; 171: fuel gas introduction manifold; 172: fuel gas discharge manifold; 176: anode chamber; FG: fuel gas; FOG: fuel offgas; OG: oxidizer gas; and OOG: oxidizer offgas

The invention claimed is:

1. An electrochemical reaction cell stack comprising a plurality of electrochemical reaction units arrayed in a first direction,
wherein at least one of the electrochemical reaction units is an electrochemical reaction unit,
the electrochemical reaction unit includes:
a unit cell including an electrolyte layer, and a cathode and an anode that face each other in a first direction with the electrolyte layer intervening therebetween; and
a structural member that faces a cathode chamber facing the cathode or an anode chamber facing the anode,
wherein the structural member is formed of a mica-made member that has been subjected to a heat treatment of 1,000° C. or higher for four or more hours so as to exhibit an intensity peak of $KMg_3(Si_3Al)O_{10}(OH)_2$ and an intensity peak of $Mg_2SiO_4$ in X-ray diffractometry (XRD), prior to assembling the structural member into the electrochemical reaction unit.

2. The electrochemical reaction cell stack according to claim 1, wherein the ratio of the intensity of a peak of the (120) plane of $Mg_2SiO_4$ to the intensity of a peak of the (003) plane of $KMg_3(Si_3Al)O_{10}(OH)_2$ is 0.001 or more.

3. The electrochemical reaction cell stack according to claim 1, wherein the ratio of the intensity of the peak of the (120) plane of $Mg_2SiO_4$ to the intensity of the peak of the (003) plane of $KMg_3(Si_3Al)O_{10}(OH)_2$ is 0.15 or less.

4. The electrochemical reaction cell stack according to claim 1, wherein the ratio of the intensity of the peak of the (120) plane of $Mg_2SiO_4$ to the intensity of the peak of the (003) plane of $KMg_3(Si_3Al)O_{10}(OH)_2$ is 0.003 or more.

5. The electrochemical reaction cell stack according to claim 1, wherein the ratio of the intensity of the peak of the (120) plane of $Mg_2SiO_4$ to the intensity of the peak of the (003) plane of $KMg_3(Si_3Al)O_{10}(OH)_2$ is 0.029 or less.

6. The electrochemical cell stack according to claim 1, wherein the structural member formed of a mica-made member is subjected to heat treatment prior to assembly so as to reduce Si scattering of the mica upon operation of the assembled electrochemical reaction unit.

* * * * *